July 18, 1933.　　　W. H. CAMPBELL　　　1,918,320
METHOD OF AND APPARATUS FOR BUILDING PNEUMATIC TIRE CASINGS
Filed May 23, 1928

Inventor
Wallace H. Campbell
By
Attorney

Patented July 18, 1933

1,918,320

UNITED STATES PATENT OFFICE

WALLACE H. CAMPBELL, OF AKRON, OHIO, ASSIGNOR TO THE GOODYEAR TIRE & RUBBER COMPANY, OF AKRON, OHIO, A CORPORATION OF OHIO

METHOD OF AND APPARATUS FOR BUILDING PNEUMATIC TIRE CASINGS

Application filed May 23, 1928. Serial No. 280,106.

The invention relates to the manufacture of pneumatic tire casings for motor vehicles and it has particular relation to a novel method of and apparatus for constructing such casings.

An object of the invention is to provide a method of constructing pneumatic tire casings which shall be especially applicable for the manufacture of such articles in large numbers and at a relatively high rate.

Another object of the invention is to provide a method of manufacturing pneumatic tire casings in which the operations heretofore performed directly upon a tire building drum will be distributed progressively throughout a region remote therefrom.

Another object of the invention is to provide a method of manufacturing pneumatic tire casings in which many of the intermediate operations which were essential to the methods heretofore employed will be dispensed with.

Another object of the invention is to provide a method which is capable of supporting the construction of pneumatic tire casings directly in combination with known machines now being employed in the preparation of the elements of which such casings are composed.

Another object of the invention is to provide a simple and inexpensive apparatus for efficiently practicing the aforesaid method.

Heretofore pneumatic tire casings generally have been constructed by applying manually to a tire building drum, the elements composing them, such as bias cut plies of cord fabric material, beads, breaker strips, chafing strips, tread bands, etc. Each tire building machine employed in the construction of pneumatic tire casings according to such methods, comprised a separate and independently operable unit which was limited in its production capacity to the speed and dexterity of a skilled operator in performing a plurality of tedious and manual operations successively. Since such tire building machines each represented a relatively comprehensive mechanical structure and were required to be operated severally by attendants working independently of each other, the cost of producing pneumatic tire casings according to this and similar methods accordingly was relatively great. Also, to support the operation of these machines in large numbers, it was necessary to employ expensive conveyor systems and other auxiliary apparatus in order properly to prepare and transport to the tire machines, the constructional elements employed in building the tire casings.

This invention comprises a method of constructing pneumatic tire casings in which the bands, breaker strips, chafing strips, treads, and other elements composing them are positioned in their order of application upon a support having a tire building drum disposed tangentially thereon. When the support and drum are moved relative to each other the elements composing a tire casing adhere successively to the latter thus expeditiously assembling a pneumatic tire casing. The relative movement of the drum and the support may be effected either by the rotation of the former or the translation of the latter or both.

For a better understanding of the invention, reference may now be had to the accompanying drawing, forming a part of this specification, in which.

Figure 3:
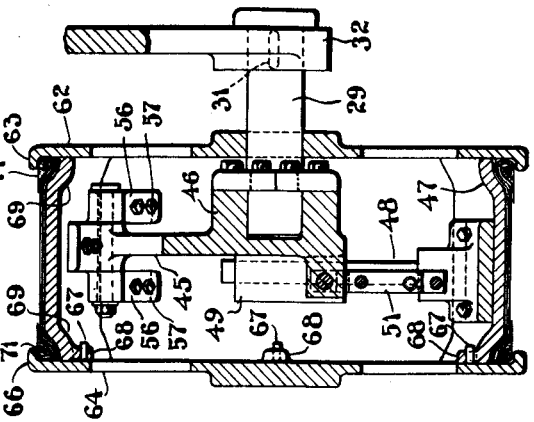
Fig. 3 is a cross-sectional view, on a further enlarged scale, of a tire building drum embodied in the apparatus illustrated in Fig. 2 and taken substantially on line III—III thereof.
Figure 1:
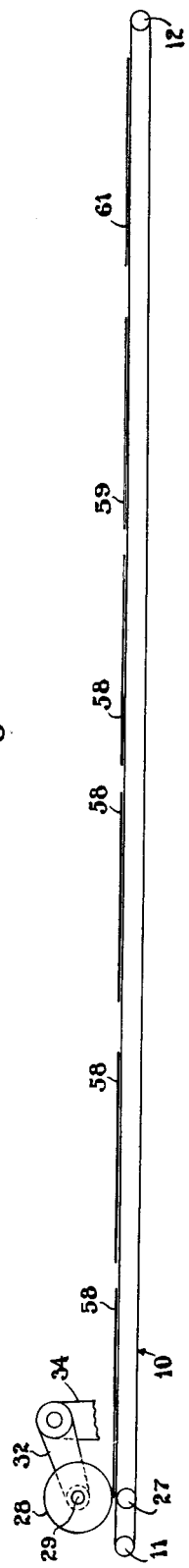
Fig. 1 is a diagrammatical view of an apparatus which may be employed in practicing the invention.
Figure 2:
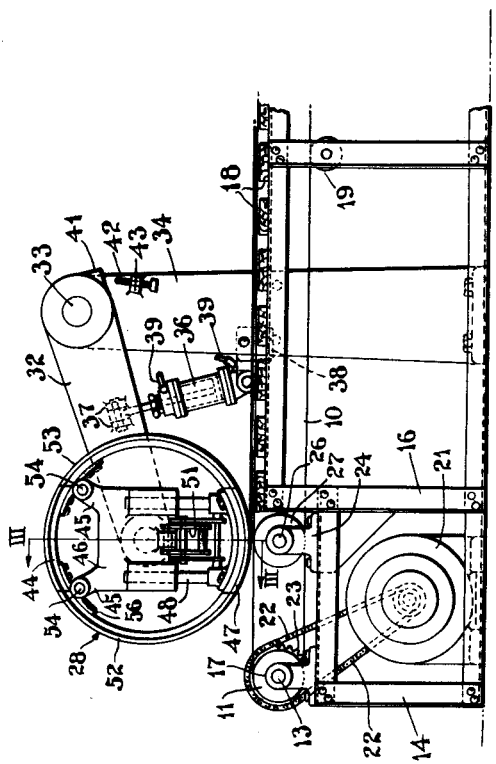
Fig. 2 is a fragmentary view, on a larger scale, of the apparatus illustrated in Fig. 1.

In the embodiment of the invention selected for the purpose of illustrating the principal features thereof, a relatively long conveyor 10 is supported at its opposite ends by rollers 11 and 12 which are provided with axially disposed shafts 13. Fabricated brackets 14, secured rigidly to the opposite ends of a centrally disposed fabricated frame 16, support bearings 17, in which the shafts 13 are rotatably mounted. Spaced cross-members 18, secured rigidly upon the frame 16, slidably engage and support the upper reach of the conveyor 10.

Idling rollers 19, secured at intervals along the frame 16 below the cross-members 18, likewise support the lower reach of the conveyor 10. A motor 21, positioned adjacent one end of the frame 16, drives a sprocket chain 22 which is associated operatively with a sprocket wheel 23 secured rigidly at the end of one of the roller supporting shafts 13. The motor 21 is provided with any suitable form of clutch mechanism (not shown), for controlling the periods of operation of the conveyor 10. Adjacent one end of the frame 16, bearings 24, secured rigidly to the brackets 14, rotatably support a shaft 26 of an idling roller 27 disposed in operative engagement with the upper reach of the conveyor 10.

A tire building drum 28, engaging the upper reach of the conveyor 10 on the side thereof directly opposite the idling roller 27, is rotatably supported on a shaft 29 which is keyed, as indicated at 31, in an opening formed in one end of an arm 32. The opposite end of the arm 32 is pivotally supported on a pin 33 which is rigidly secured in the upper end of a vertically disposed standard 34. Normally the tire building drum 28 rests by its own weight upon a portion of the conveyor 10 which is supported by the idling roller 27. However, the drum may be elevated, when desired, by the operation of a fluid pressure piston and cylinder mechanism 36, which is operatively mounted between a pair of lugs 37 formed intermediate the ends of the arm 32 and a bracket 38, which is secured rigidly to an intermediate portion of the standard 34. Fluid under pressure is supplied to opposite ends of the piston and cylinder mechanism by a pair of conduits 39 communicating with a compressor (not shown).

The movement of the arm 32, incidental to the operation of the piston and cylinder mechanism 36, is limited in one direction by a lug 41 projecting beyond the end portion of the arm adjacent the pin 33. The lug is engaged by the end of a set screw 42 which is screw-threaded in an opening formed in a boss 43 projecting normally from an adjacent portion of the standard 34.

The tire building drum 28 comprises an arcuate section 44, which is secured rigidly at opposite ends upon a pair of arms 45 that project radially from a centrally disposed hub 46, in which the shaft 29 is rotatably mounted. An arcuate section 47, disposed oppositely to the section 44, is secured rigidly upon the ends of a pair of rods 48, the opposite ends of which are disposed slidably within parallel openings formed in a pair of bosses 49 that project normally from the front surface of the hub 46 in transverse relation to the shaft 29. A latching device 51 controls the position of the section 47 relative to the hub 46.

Oppositely disposed arcuate sections 52 and 53, comprising the remaining peripheral portions of the drum 28, are mounted upon spaced pairs of brackets 56 which are secured rigidly, by bolts 57, to the upper ends of the sections on opposite sides of the arms 45. Pins 54, rigidly secured in aligned openings formed in the brackets 56 and pivotally mounted within openings formed in the arms 45, support the sections in variable positions relative to the section 44. The ends of the sections 52 and 53, opposite the pins 54, are adapted to abut end portions of the section 47 when the latter is in its extreme outer position.

The drum 28 is provided, at one side thereof, with a bead placing ring 62 which is slidably mounted at its axis upon the shaft 29. The outer edge of the ring is provided with a laterally projecting flange 63, the diameter of which is slightly greater than the diameter of the outer periphery of the drum 28. During the normal operation of the apparatus the bead placing ring 62 is disposed remotely from the drum 28 in abutting relation to the end of the arm 32 supporting the shaft 29. A similar bead placing ring 64, having a correspondingly disposed flange 66, is provided with laterally projecting pins 67, which are adapted slidably to engage complementary openings formed in lugs 68 projecting radially from the inner peripheral surface of the drum 28. During the normal operation of the apparatus, the pins 67 are disengaged from the openings within the lugs 68 and the bead placing ring 64 is disposed inoperatively adjacent the apparatus.

Adjacent the opposite edges of the drum 28, oppositely disposed inwardly tapering edge portions 69 are provided for receiving tire building beads employed in the construction of pneumatic tire casings, which beads are disposed thereon, periodically, by the operation of the aforesaid bead placing rings 62 and 64.

In the operation of the illustrated embodiment of the invention, the constructional elements of a pneumatic tire casing comprising bias cut rubberized fabric plies 58, breaker and chafing strips 59, and a tread 61, are positioned in the order of their application upon the conveyor 10. When the upper reach of the latter is moved toward the drum 28, the materials deposited thereon are picked up successively by the drum and stitched firmly in superimposed relation by the force of gravity affecting the drum. The force tending to stitch the materials upon the drum may be increased, if desired, by supplying fluid under pressure to the upper end of the piston and cylinder mechanism 36 during the operation of the conveyor 10. After any suitable number of the plies 58 have been superimposed upon the drum 28, the latter may be elevated relative to the conveyor 10 by supplying fluid under pressure to the lower end of the piston and cylinder mechanism 36, during which period the motion of the conveyor 10 may be discontinued, if desired.

Tire building beads 71 which have been positioned operatively within the flanges 63 and 66 of the bead placing rings 62 and 64 respectively are deposited upon the edges of the bands 58 supported by the tapering portions 69 of the drum 28 by urging the bead rings against the opposite edges of the latter. After removing the bead placing rings 62 and 64 from operative engagement with the drum 28, the latter is lowered again into engagement with the conveyor 10 by exhausting the fluid from the lower end of the piston and cylinder mechanism 36. By moving the upper reach of the conveyor again in the direction of the drum 28, the remaining constructional elements of a pneumatic tire casing are stitched thereupon.

The plies 58 may be deposited, if desired, directly upon the conveyor 10 from bias cutters (not shown) positioned adjacent thereto. Likewise the other constructional elements of a pneumatic tire casing may be received directly upon the conveyor 10 from machines for preparing them situated adjacent thereto.

From the foregoing description, it is apparent that the invention is embodied by an apparatus for building pneumatic tire casings, which is capable of a relatively high production rate by reason of the elimination of the tedious manual operations which heretofore were performed successively by a single attendant working at a tire building machine. Since the tire building materials may be deposited upon a relatively long conveyor belt either simultaneously during its inoperative periods or successively while the tire is being formed upon the drum, a single tire building apparatus may be operated almost continuously at a relatively high rate, either by employing the services of a relatively small number of unskilled workmen or by employing automatic material preparing machines which deposit the constructional elements of a pneumatic tire casing directly upon the conveyor 10.

Although I have illustrated only the preferred form which the invention may assume and have described that form in detail, it will be apparent to those skilled in the art that the invention is not so limited but that various modifications may be made therein without departing from the spirit of the invention or from the scope of the appended claims.

What I claim is:

1. A tire building machine comprising an endless conveyor for supporting in succession a plurality of the elements of a pneumatic tire casing, a tire building drum disposed tangently to the conveyor, a roller engaging the conveyor on the side thereof directly opposite the drum, and means for supporting the drum in variable relation to the conveyor.

2. A tire building machine comprising an endless driven conveyor for supporting in succession a plurality of elements of a pneumatic tire casing, a tire building drum rotatably mounted adjacent one end of the conveyor, a support engaging the conveyor on the side thereof directly opposite the drum, and means for supporting the drum in variable relation to the conveyor.

3. A tire building machine comprising an endless driven conveyor for supporting in succession a plurality of elements of a pneumatic tire casing, a tire building drum rotatably mounted adjacent one end of the conveyor, and means for supporting the drum in variable relation to the conveyor.

4. A tire building machine comprising an endless driven conveyor for supporting in succession a plurality of elements of a pneumatic tire casing, a movable arm, a tire building drum rotatably mounted on the arm adjacent one end of the conveyor, a roller engaging the conveyor directly opposite the drum, and fluid operated means for positioning the drum in variable relation to the conveyor.

5. A method of building pneumatic tire casings which comprises moving a plurality of tire casing constructional elements in the order of their application into position to be wound upon a rotating tire building drum, and stitching said elements upon said drum by maintaining the latter in engagement with a movable surface tangential to the drum.

6. The step in the method of building pneumatic tire casings which comprises stitching the tire casing constructional elements upon a rotating tire building drum by holding the drum in contact with a movable surface tangential to the drum.

WALLACE H. CAMPBELL.